(12) United States Patent
Krause

(10) Patent No.: US 7,904,060 B2
(45) Date of Patent: Mar. 8, 2011

(54) DYNAMIC PRL ASSIGNMENT SYSTEM

(75) Inventor: Kevin R. Krause, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 1077 days.

(21) Appl. No.: 11/612,735

(22) Filed: Dec. 19, 2006

(65) Prior Publication Data

US 2008/0146202 A1    Jun. 19, 2008

(51) Int. Cl.
*H04M 3/42* (2006.01)
(52) U.S. Cl. .......... 455/414.1; 455/404.1; 455/404.2; 455/432.1; 455/432.2; 455/432.3; 455/433; 455/434; 455/435.1; 455/435.2; 455/435.3
(58) Field of Classification Search .... 455/432.1–435.3, 455/404.1–404.2
See application file for complete search history.

(56) References Cited

U.S. PATENT DOCUMENTS

| 5,950,130 | A  | * | 9/1999 | Coursey    | 455/432.1 |
| 6,564,055 | B1 | * | 5/2003 | Hronek     | 455/433   |
| 2004/0142659 | A1 | * | 7/2004 | Oesterling | 455/11.1  |
| 2004/0162087 | A1 | * | 8/2004 | Fan et al. | 455/456.1 |

* cited by examiner

*Primary Examiner* — Rafael Pérez-Gutiérrez
*Assistant Examiner* — Lameka Kirk
(74) *Attorney, Agent, or Firm* — Leydig, Voit & Mayer, Ltd

(57) ABSTRACT

A system for selectively providing an updated PRL to a remote wireless device reduces airtime requirements by determining the PRL to be loaded based on a collection of information relating to the wireless device. Depending upon the nature, connectivity and location of the device, the system loads a partial or full PRL, and may in certain circumstances decline to load any PRL, instead flagging the existing PRL as out-of-date.

6 Claims, 4 Drawing Sheets

DYNAMIC PRL ASSIGNMENT SYSTEM

TECHNICAL FIELD

The invention relates generally to wireless communications to and from mobile vehicle telematics units, and more particularly relates to a system and method for dynamically updating a preferred roaming list for use by a telematics unit.

BACKGROUND OF THE INVENTION

By virtue of the fact that mobile wireless communications devices are mobile, it is sometimes complicated to ensure continued connectivity. For example, there are many carriers and providers, and a user may well venture into areas where their chosen provider does not have equipment available to provide the desired service. In these instances, the user is said to be "roaming." Roaming entails the use of a network other than the user's assigned or chosen primary carrier and network.

When a device is roaming, the user may be charged a different, and potentially much larger, fee than they typically pay to their primary network. In addition, since they generally are still required to pay their primary network, this situation can result in the incurrence of exorbitant fees in a short amount of time. To ameliorate this situation, network providers typically have certain partners that they prefer to use for roaming services. The use of the partner facilities will enable the mobile user to incur lower charges, and in some cases receive better service, than they otherwise would have.

With respect to CDMA, PCS and other services for example, the selected partner networks are typically listed in what has come to be known as a Preferred Roaming List (PRL). The PRL is a data file that lists alternative networks for use when a primary wireless network is not reachable, by listing bands, sub bands and service provider identifiers a device should accept. A mobile wireless, e.g., cellular, device may or may not be able to obtain service outside of a home area without the PRL, and in addition, if the device is able to roam, the incurred fees may be significant. The PRL allows the mobile device to select the best carriers when roaming. For example, roaming partners may provide discounted roaming rate agreements, and so it is desirable to use such carriers when possible and to avoid carriers that may not be affiliated with the primary network and which may therefore charge a premium roaming fee to users.

Thus, it is generally advisable that the PRL for a mobile device be maintained in a reasonably up-to-date state. This is especially important for users that travel and use their device outside of their home area frequently. Not only are such mobile users more likely to use other networks, but they are more likely to make substantial use of such carriers and thus to incur significant overcharges if lack of an appropriate PRL prevents them from using preferred roaming partners.

However, currently available PRL updating systems require substantial use of airtime, at a considerable cost, to provide PRL updates. For example, since each carrier has its own PRL, when a new wireless subscriber activates their account and receives a hands-free/personal calling phone number (MIN/MDN), a new PRL must be loaded in the device to support the new network/carrier. Current update systems use a combination of air interface functions (AIFs) and the carriers' over the air (OTA) provisioning platforms to accomplish such updates using reduced and full versions of PRLs. Unfortunately, it is disadvantageous to use AIF transmissions in this context due to the relatively lower data transfer rate and associated airtime charges.

This disclosure describe a system for providing PRL updates while minimizing the expense involved in associated data transfers.

BRIEF SUMMARY OF THE INVENTION

While aspects of the invention will be discussed in detail below, this brief summary of the disclosure provides an overview of certain elements of the described examples.

The invention relates generally to a system for providing an updated PRL to a remote wireless device such as a vehicle telematics device, while largely overcoming several shortcomings of prior techniques. In one example the disclosed system significantly reduces airtime requirements for initial configuration transmissions by eliminating or minimizing the time required for PRL download. In a further example, the process uses a collection of information to determine the best PRL download content and method. Such information can include the network that a device is accessing, the associated vehicle's current ignition status, the device's call mode, and other information. In an alternative example, the location of the vehicle is derived and is used to select an appropriate PRL.

According to one example, a call center places a configuration call to the telematics unit. The call center then reads certain vehicle information and uses this information to determine an appropriate PRL. The selected PRL may then be loaded onto the telematics unit by the call center. The method of loading of the PRL and indeed whether or not the PRL is immediately loaded is based in one example on the vehicle information.

In an example, the process of determining an appropriate PRL and download methodology entails determining if the device is roaming, e.g., whether the current SID belongs to the home carrier. If the device is not roaming and the vehicle ignition is on (or it is off, but the device call mode is analog), then a partial PRL is loaded. Similarly, if the device is roaming but it is in a region supported by the carrier, then the partial PRL is loaded. However, in a further example, if the device is roaming and is in a region not supported by the carrier, then a full carrier PRL is loaded. Moreover, if the device is not roaming, the vehicle ignition is off, and the device call mode is digital, then the absence of an up-to-date PRL is flagged but no supplemental PRL is loaded at that time.

This system allows, in many examples, for the carrier to save airtime costs by minimizing the circumstance in which a full PRL is transmitted and loaded. Other objects and advantages of the invention will become apparent upon reading the following detailed description and upon reference to the drawings.

DESCRIPTION OF AN EXEMPLARY EMBODIMENT

Before describing the invention in detail, an exemplary environment in which the invention may operate will be described. It will be appreciated that the described environment is for purposes of illustration only, and does not imply any limitation regarding the use of other environments to practice the invention.

Figure 1:
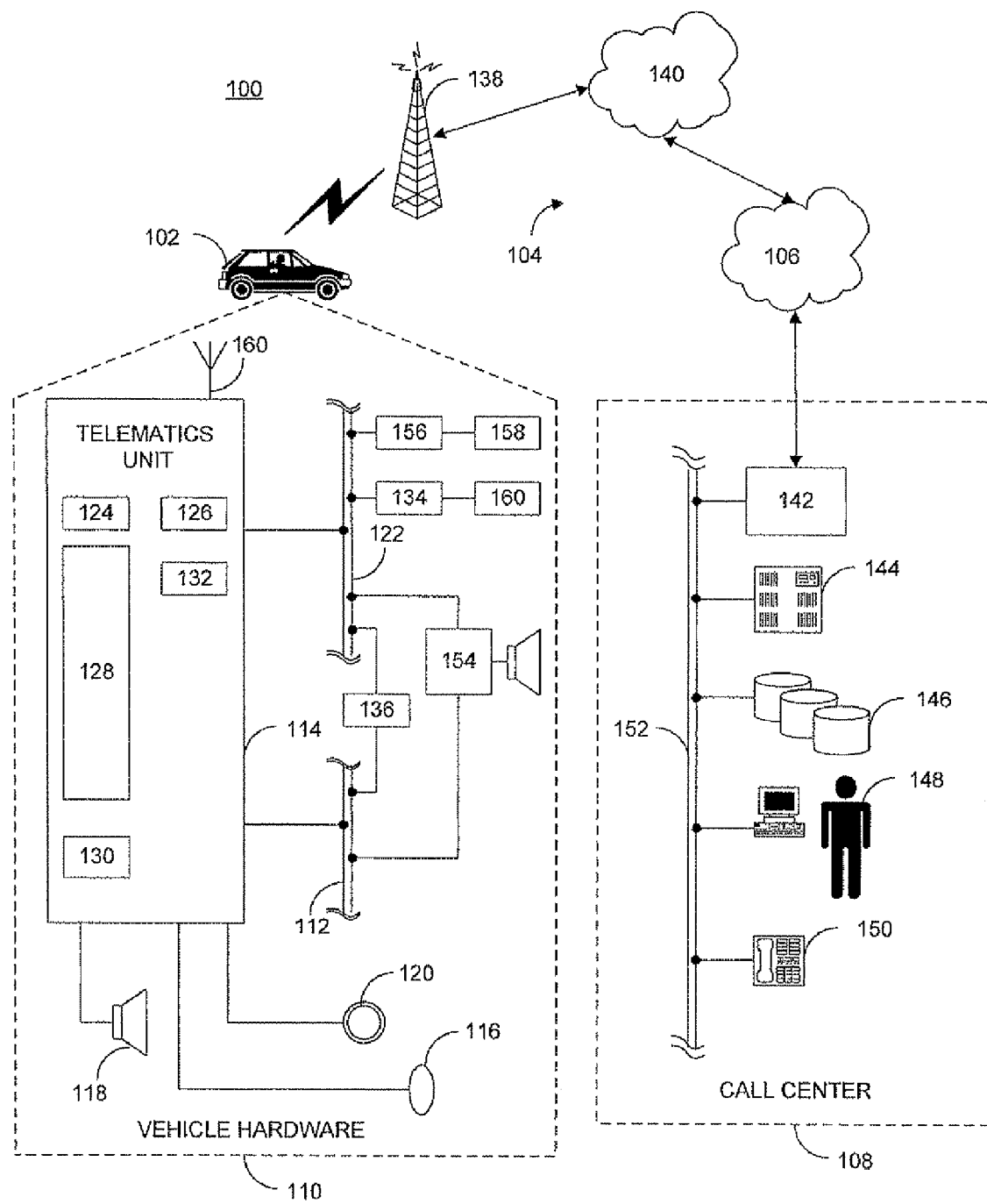
FIG. 1 is a schematic view of an example communication system within which examples of the present invention may be used.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100, however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, videogames and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 will include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic pushbutton used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DYD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 160, connected to various sensor interface modules 134 are operatively connected to the vehicle bus 122. Examples vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. As appreciated by those skilled in the art, various cell tower/based station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber of other optical network, a cable network, other wireless networks such as wireless local networks (WLANs) or networks providing broadband wireless access (BWA), or any combination thereof.

Call center 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

The examples herein will disclose a preferred technique and system for configurably caching data in a telematics unit cache so that the data is available when the vehicle is not in operation and the telematics unit is not generally powered on. In particular, the remote caller can remotely configure the telematics unit cache to selectively store data of interest. Subsequently, even when the vehicle is off, the telematics module can accept calls from the call center and the cached information can be pulled. Thus, the configurable cache allows a remote caller to configure the cache to store desired data to be later uploaded without requiring a call-back from the telematics unit and without limiting the cached data to predetermined data groups.

The methods of the following examples are ideally employed in an environment including a telematics-equipped vehicle and wholly or partially wireless communications infrastructure as described above by reference to FIG. 1. It will be appreciated that the illustration of FIG. 1 describes an exemplary system, and that many of the elements of FIG. 1 are not essential to the operation of the invention described in the various examples herein. The steps of the method that are performed remotely to the vehicle and the telematics unit may be performed by any appropriate device or facility, but in one example, the process is executed at the call center 108.

As discussed above, it is often important to provide and/or update a preferred roaming list (PRL). Unfortunately, existing methods for PRL provision and update require substantial airtime usage and the incurring of related fees and expenses. Although the examples discussed herein will be considered in the context of a PRL structure, it will be appreciated that the disclosed techniques are usable for other roaming lists as well. For example, the techniques may be used in the context of MNCA with respect to GSM carriers, and in the context of IRDB with respect to older TDMA carriers.

Figure 2:
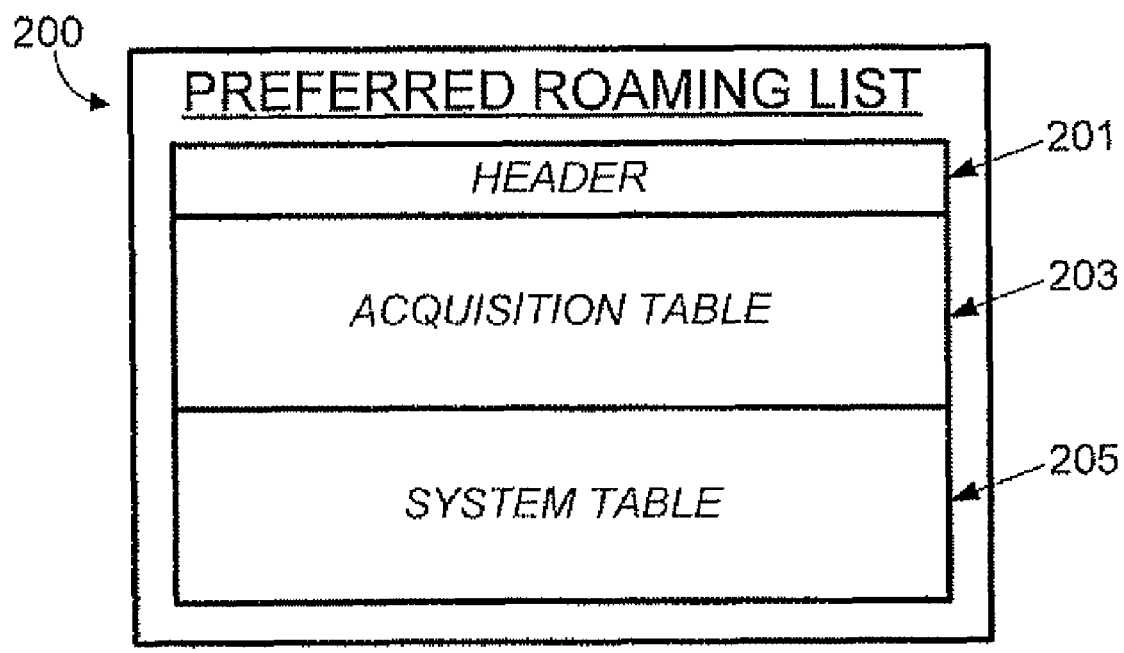
FIG. 2 is an abstract data diagram illustrating a PRL structure usable in conjunction with certain of the disclosed examples.

FIG. 2 is an abstract data diagram illustrating a PRL structure usable in conjunction with certain of the example techniques disclosed herein. It will be appreciated that the exact structure of the PRL used within examples of the invention need not follow the example of FIG. 2 nor conform to any particular format. Thus, while the illustrated structure is consistent with TIA/EIA IS-683, any other structure whether consistent with this recommendation or not may be used.

The exemplary PRL 200 comprises a collection of associated data fields for storing information related to preferred roaming partners. The illustrated data fields include a header 201, an acquisition table 203, and a system table 205. The header 201 contains information usable for administrative purposes, e.g., to locate the table, track the version and/or date of the table, and so on. The acquisition table 203 contains a tabulation of frequencies and service types usable by the telematics device to connect to preferred roaming partner networks. The system table 205 indicates which network systems the telematics unit is to use and/or or ignore, and may also contain data for mapping systems to geographic areas. In total, these elements are usable to specify a selection of one or more alternative networks for roaming.

In an example of the invention, a PRL and download method are selected based on a number of criteria. In particular, the technique according to an example tailors the method for loading the most appropriate PRL into a mobile device, based on the device's current location, status, and the user's data record. This technique can reduce the incidence of improper PRL assignment for customers who are outside of their home area, and is also able to provide a reduction in network costs related to PRL downloads.

In overview, the process involves determining a number of pieces of information including (1) the network that the device is currently accessing, (2) whether or not that network belongs to the pending home carrier, (3) the vehicle's current ignition status, and (4) the device's call mode (access technology). In an alternative example, the geographic region, e.g., state or province, where the vehicle is currently located can be derived from a transmitted latitude/longitude and the appropriate PRL is derived from this real-time location data and the pending carrier. Based on these inputs, the most appropriate download method as well as the most appropriate file to download is selected. The updating of PRL information at the telematics unit may comprise replacing or supplementing an out of date PRL or establishing a PRL initially where none exists.

Figure 3:
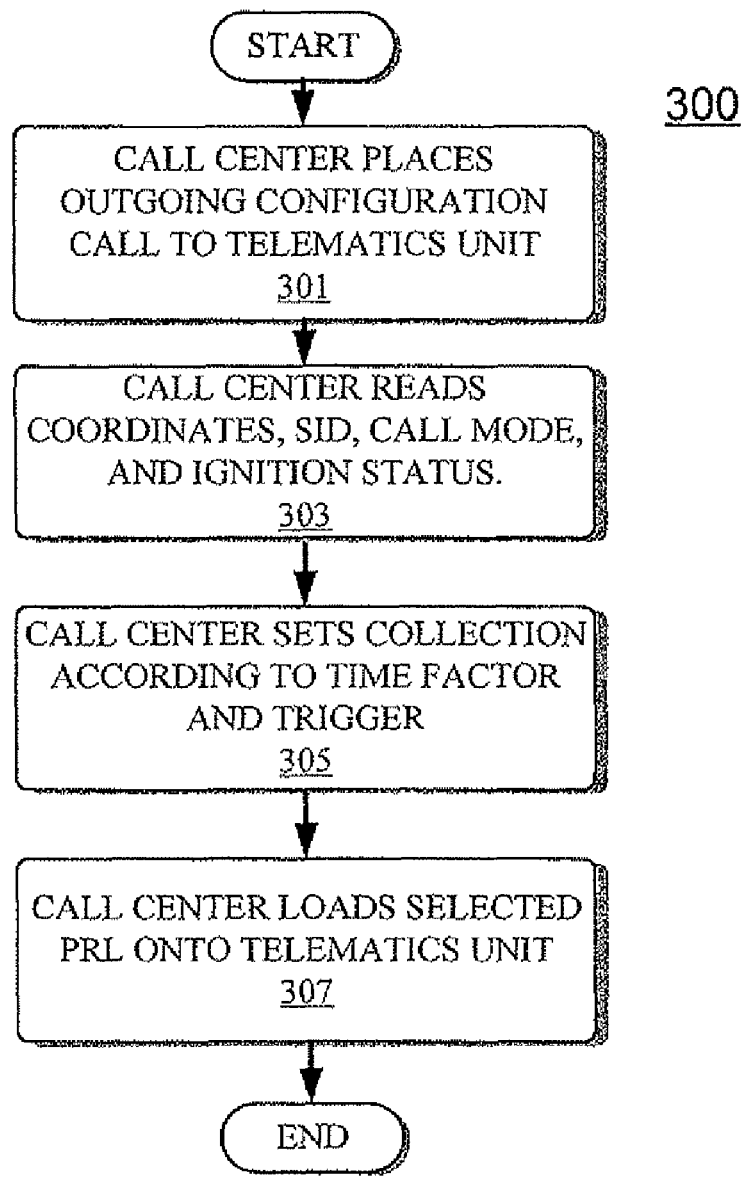
FIG. 3 is a flow chart illustrating a method of determining and loading a PRL according to an example of the invention.

FIG. 3 is a flow chart illustrating a method of determining and loading a PRL according to an example of the invention. In particular, at stage 301 of the process 300, the call center 108 places an outgoing configuration call to the telematics unit of interest. The outgoing call is placed using the infrastructure as described with reference to FIG. 1 in an example, but may be placed in another fashion within the scope of the invention.

At stage 303, the call center 108 reads the vehicle identification information including the locational coordinates (e.g., latitude and longitude), the SID (system identification number), i.e., the identity of the network that the device is currently accessing, the telematics unit call mode (i.e., its access technology), and the vehicle's ignition status. In one example, vehicle identification information is determined in combination with subscriber profile records resident in database 146. Cellular SIDs are generally unique codes assigned to cellular telephone system operators, and can be used to identify the home system of a cellular base station currently in use. This in turn can be used in discerning a device's roaming status.

The process flows to stage 305, at which stage the call center 108 determines an appropriate PRL based on the vehicle identification information obtained in step 303. This process will be described below in greater detail with respect to FIG. 4. After execution of stage 305, the selected PRL is loaded onto the telematics unit by the call center 108 at stage 307. In one example, the method of loading of the PRL is based on the selected PRL. For example, if the selected PRL is a partial carrier PRL, then the PRL may be loaded during the configuration call or via an AIF. If the selected PRL is a full carrier PRL, then the PRL is loaded by the call center 108 using the OTASP facilities.

Figure 4:
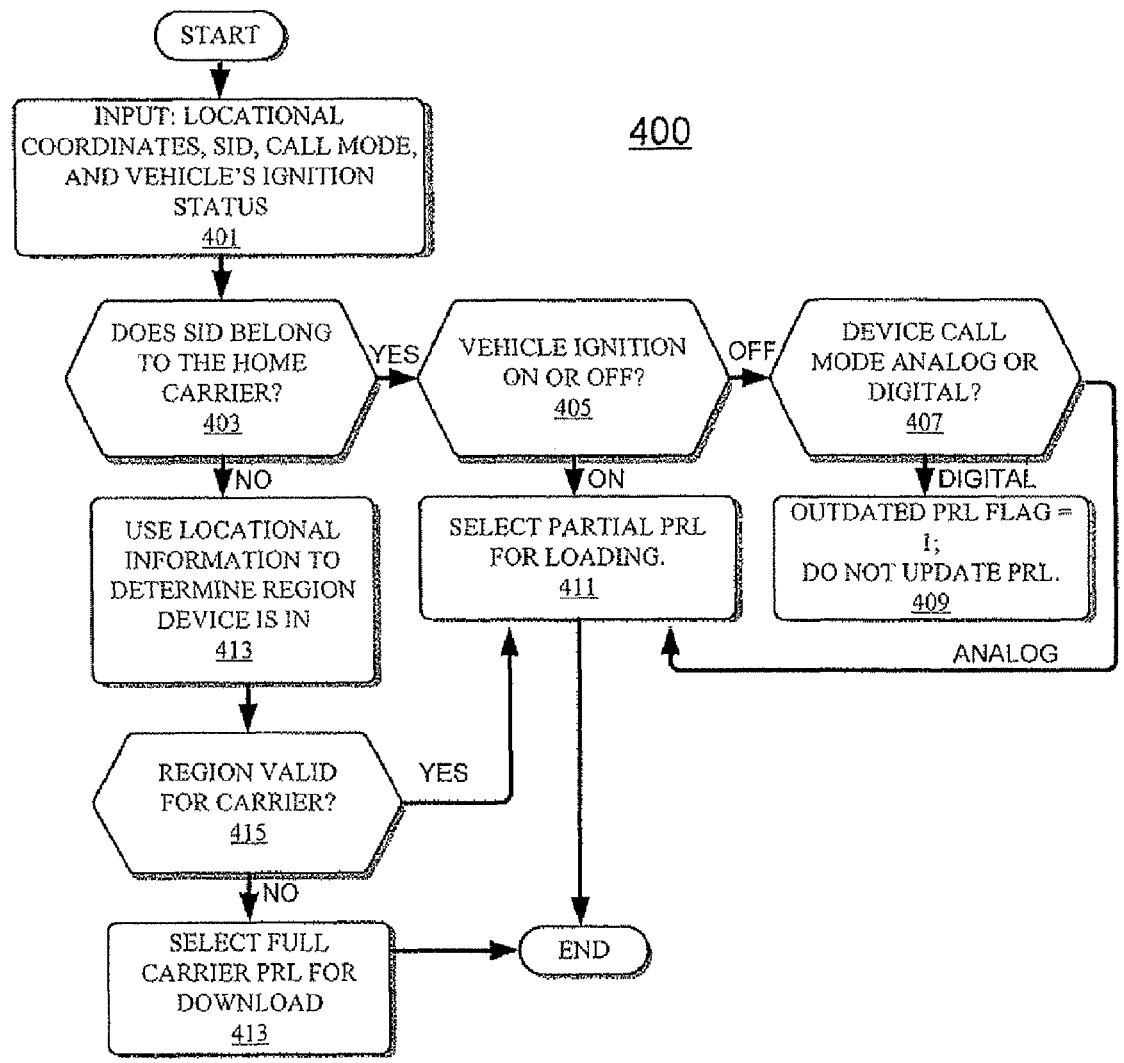
FIG. 4 is a flow chart illustrating a process of determining an appropriate PRL for loading onto the telematics unit within an example of the invention.

As noted in reference to the process illustrated in FIG. 3, the appropriate PRL is selected based on a number of factors related to the telematics unit and its location. The flow chart of FIG. 4 illustrates in greater detail a process of determining an appropriate PRL for loading onto the telematics unit. At stage 401, the PRL selection process 400 accepts as input the vehicle identification information, e.g., the unit's locational coordinates, the SID, the unit's call mode, and the vehicle's ignition status.

At stage 403, the PRL selection process 400 determines whether the SID belongs to the home carrier. If it is determined that the SID does belong to the home carrier, then the process 400 flows to stage 405, whereat it is determined whether the vehicle ignition is on or off. If the vehicle ignition is determined at stage 405 to be off, then the process 400 flows to stage 407, whereupon the process 400 evaluates whether the device call mode is analog or digital.

Digital cellular provides greater bandwidth than analog cellular, and digital transmissions tend to be more resistant to static, signal fading, etc. Analog cellular technology has a fairly wide installed base and provides improved sound quality. The major analog cellular system types currently in operation include advanced mobile phone system (AMPS), Nordic mobile telephone (NMT), and total access communications systems (TACS). The major digital cellular system types currently in operation include global system for mobile communications (GSM), time-division multiple access (TDMA), Hughes enhanced TDMA (E-TDMA), and code-division multiple access (CDMA). It will be appreciated that the use of the invention is not limited to the foregoing types of cellular technology, but is usable within other contexts as well.

If the vehicle call type is determined at stage 407 to be digital, then the process 400 flows to stage 409. At stage 409, the process 400 sets the outdated PRL flag (e.g., to 1) and does not update the PRL. If instead it is determined at stage 407 that the vehicle call type is analog, then the process 400 flows to stage 411, wherein the call center 108 selects a partial PRL for loading. Similarly, if at stage 405 the vehicle ignition is determined to be on, then the process 400 flows to stage 411 and selects a partial PRL for loading.

If instead it was determined at stage 403 that the SID does not belong to the home carrier, then the process 400 flows to stage 413. At stage 413, the process 400 uses the locational information to determine the region, e.g., the state or province, within which the device is presently located.

At stage 415, the process 400 determines whether the region is valid for the carrier. In other words, based on available PRLs, it is determined whether the carrier supports service in the identified region. If not, the process 400 flows to stage 417, at which a full carrier PRL is selected for download. Otherwise, the process flows to stage 411 whereat an appropriate partial carrier PRL is selected. The process 400 terminates after either of stages 411 or 413.

It will be appreciated that the foregoing methods and implementations for PRL updating are merely examples, and that these illustrate a preferred technique. However, it is contemplated that other implementations of the invention may differ in detail from foregoing examples. As noted earlier, all references to the invention are intended to refer only to the example of the invention being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of providing a preferred roaming list to a telematics unit associated with a vehicle for specifying preferred alternative carrier for use when a primary wireless carrier is not reachable by the telematics unit, the method comprising:

transmitting a request to the telematics unit, wherein the request initiates an information transmission from the telematics unit, the information transmission comprising a geographic location of the unit, an SID of a network that the unit is accessing, a call mode of analog or digital cellular, and a vehicle ignition status of on, wherein the vehicle is drivable, or off, wherein the vehicle is not drivable;

receiving the information transmission from the telematics unit;

selecting a preferred roaming list for transmission to the telematics unit by determining whether the SID is associated with the primary wireless carrier and if not identifying a region containing the telematics unit, and determining whether the identified region is valid for the primary wireless carrier and if not selecting a full carrier preferred roaming list, and otherwise selecting a partial carrier preferred roaming list;

transmitting the selected preferred roaming list to the telematics unit if the selected preferred roaming list is a full preferred roaming list or a partial preferred roaming list; and determining whether the vehicle ignition status is on or off if the SID is associated with the primary wireless carrier, and if the status is on, selecting a partial carrier preferred roaming list, and if the status is off determining whether the call mode is analog or digital, and flagging a current preferred roaming list as out of date if the call mode is digital and otherwise selecting a partial carrier preferred roaming list.

2. A non-transitory computer-readable medium for performing a method of providing a preferred roaming list to a telematics unit associated with a vehicle for specifying preferred alternative carrier for use when a primary wireless carrier is not reachable by the telematics unit, the non-transitory computer-readable medium comprising computer-readable instructions for:

transmitting a request to the telematics unit, wherein the request initiates an information transmission from the telematics unit, the information transmission comprising a geographic location of the unit, an SID of a network that the unit is accessing, a call mode of analog or digital cellular, and a vehicle ignition status of on, wherein the vehicle is drivable, or off, wherein the vehicle is not drivable;

receiving the information transmission from the telematics unit;

selecting a preferred roaming list for transmission to the telematics unit by determining whether the SID is associated with the primary wireless carrier and if not identifying a region containing the telematics unit, and determining whether the identified region is valid for the primary wireless carrier and if not selecting a full carrier preferred roaming list, and otherwise selecting a partial carrier preferred roaming list;

transmitting the selected preferred roaming list to the telematics unit if the selected preferred roaming list is a full preferred roaming list or a partial preferred roaming list; and determining whether the vehicle ignition status is on or off if the SID is associated with the primary wireless carrier, and if the status is on, selecting a partial carrier preferred roaming list, and if the status is off determining whether the call mode is analog or digital, and flagging a current preferred roaming list as out of date if the call mode is digital and otherwise selecting a partial carrier preferred roaming list.

3. A method of updating a preferred roaming list (PRL) within a telematics device for specifying preferred alternative carrier for use when a primary wireless carrier is not reachable by the telematics device, the method comprising:

receiving a configuration request at the telematics device from a call center requesting information comprising geographic location of the telematics device, an identity of a network that the telematics device is currently accessing, a call mode of the telematics device, and a vehicle ignition status of a vehicle associated with the telematics device;

collecting configuration information specified by the request;

transmitting the requested information from the telematics device to the call center;

receiving a PRL response from the call center at the telematics device specifying an update action; and updating a PRL at the telematics device in accordance with the PRL response by flagging an existing PRL as out of date without altering the existing PRL if the telematics device is not roaming, the vehicle ignition is not on, and the device call mode is digital.

4. The method according to claim 3, wherein updating the PRL at the telematics device in accordance with the PRL response comprises one of updating an existing PRL and replacing an existing PRL.

5. The method according to claim 3, wherein updating the PRL at the telematics device in accordance with the PRL response comprises updating a PRL at the telematics device in accordance with a full preferred roaming list.

6. The method according to claim 3, wherein updating the PRL at the telematics device in accordance with the PRL response comprises updating a PRL at the telematics device in accordance with a partial preferred roaming list.

* * * * *